United States Patent

Winter et al.

[11] Patent Number: 6,022,572
[45] Date of Patent: Feb. 8, 2000

[54] APPARATUS AND METHOD FOR DETERMINING LOAD SIZE OF FOOD PRODUCT

[75] Inventors: David B. Winter, Eaton; Robert W. Stirling, Dayton, both of Ohio

[73] Assignee: Henny Penny Corporation, Eaton, Ohio

[21] Appl. No.: 08/985,680

[22] Filed: Dec. 5, 1997

[51] Int. Cl.[7] .............................. A23L 1/00; A47J 37/00
[52] U.S. Cl. .......................... 426/231; 99/334; 99/335; 99/403; 99/486; 426/233; 426/438
[58] Field of Search .................................. 426/231, 233, 426/438, 523; 99/334, 335, 403, 486, 325; 219/518, 708

[56] References Cited

U.S. PATENT DOCUMENTS

| | | | |
|---|---|---|---|
| D. 336,007 | 6/1993 | King et al. ............................... | D7/347 |
| 4,650,970 | 3/1987 | Ohouchi ................................. | 219/518 |
| 4,814,570 | 3/1989 | Takizaki ................................. | 219/518 |
| 4,930,408 | 6/1990 | King et al. .............................. | 99/407 |
| 5,019,412 | 5/1991 | Hattori .................................... | 426/438 |
| 5,073,391 | 12/1991 | De Mans et al. ....................... | 426/231 |
| 5,402,712 | 4/1995 | King et al. .............................. | 99/407 |
| 5,483,872 | 1/1996 | Nield ...................................... | 426/231 |
| 5,486,685 | 1/1996 | Dodds .................................... | 219/518 |

OTHER PUBLICATIONS

Dialog Data Base, File 347, Dialog Acc. No. 01034533, Abstracting Japanese patent application No. 57–184833, Nov. 13, 1982.

Primary Examiner—George C. Yeung
Attorney, Agent, or Firm—Baker & Botts, L.L.P.

[57] ABSTRACT

An apparatus and method for determining a load size of a food product in a cooking device is described. The apparatus includes a carrier assembly for receiving a food product; a cooking vessel containing a cooking medium, for receiving the carrier assembly; a lid assembly for raising and lowering the carrier assembly; a weight-bearing portion for supporting the lid assembly and the carrier assembly; a load sensor placed on the weight-bearing portion so as to measure a weight of the carrier assembly, the load sensor providing an output signal; and a control device for receiving the output signal and determining cooking parameters for the food product. A method for determining a load size of a food product in a cooking device includes the following steps: weighing a carrier assembly when the carrier assembly is empty to determine an empty carrier weight; weighing the carrier assembly when the carrier assembly contains a food product to determine a loaded carrier weight; determining a differential between the empty carrier weight and the loaded carrier weight, resulting in a food product load; reporting the food product load; and modifying cooking parameters responsive to the food product load.

23 Claims, 9 Drawing Sheets

APPARATUS AND METHOD FOR DETERMINING LOAD SIZE OF FOOD PRODUCT

BACKGROUND OF THE INVENTION

1. Field of the Invention

The invention relates to apparatus and methods for determining the load size of a cooking system, such as a deep fat fryer. In particular, the invention relates to apparatus and methods for automatically determining the load size of a deep fat fryer and automatically correcting cooking parameters, such as cooking time, cooking temperature, and the like.

2. Description of the Related Art

Large capacity commercial and industrial cooking equipment, such as deep fat fryers are used to cook food products in a heated or a heated and pressurized environment. Such devices are known in the art, as described in U.S. Pat. Nos. 4,930,408, 5,402,712, and U.S. Design Pat. No. 336,007, each of which is incorporated herein by reference. Typically, such devices include a cooking vessel, which may be filled with a cooking substance, e.g., oil or shortening, and heating devices surrounding or immersed in the vessel, or both, for heating the cooking substance. Products to be cooked are placed in the vessel, either directly or in a cooking basket and are heated for a desired length of time. The cooking baskets may be either manually or automatically lifted from the cooking substance when the desired cooking time is finished.

Nevertheless, a problem exists with such cooking devices described above. The required cooking time depends on many process parameters, including food product type, cooking substance temperature, initial product temperature, product moisture content, cooking pressure, load size, and the like. Parameters such as time and temperature may be regulated by an embedded process controller in these devices. Load size, may be merely estimated and is generally selected by an operator. This manual selection often is subject to errors of judgment, or due to haste or inexperience.

It may also be difficult to determine when cooking devices, such as those described above, are not functioning properly. An effective way to determine whether the cooking device is functioning properly involves determining the yield of the cooking product, which is a comparison of the pre-cooking weight of the food product, and the post-cooking weight of the food product. If a food product has a low yield (i.e., its post-cooking weight is significantly less than its pre-cooking weight), the food product may be over cooked, which may be a result of the food product being cooked for too long, the temperature of the cooking substance being set too high, problems with the heating elements, or a combination of these or other factors. If a food product has a high yield (i.e., its post-cooking weight is significantly higher than its pre-cooking weight), the food product may be undercooked, which may be a result of the food product not being cooked long enough, the temperature of the cooking substance being too low, problems with the heating elements, or a combination of these or other factors. Without determining the pre- and post-cooking weights of the food product, it is difficult to determine an accurate yield for a cooking device.

SUMMARY OF THE INVENTION

Accordingly, a need has arisen for eliminating or reducing errors associated with selecting the load size by providing an apparatus and method for determining load size of food product. It is an object of the present invention to provide such an apparatus and method for automatically determining load size in order to reduce or eliminate the foregoing problems in the art.

It is another object of the present invention to provide an apparatus and method for using the determined load size to select or modify load size dependent cooking parameters.

It is a further object of the present invention to provide an apparatus and method for determining yield.

It is yet another object of the invention to provide an apparatus and method for signaling an alarm or displaying an error condition, or both, in the event of potential problems with the system.

According to one embodiment of the present invention, an apparatus for determining a load size of a food product in a cooking device is provided. It comprises a carrier assembly for receiving a food product; a cooking vessel, which contains a cooking medium and receives the carrier assembly; a lid assembly for raising and lowering the carrier assembly; a weight-bearing portion for supporting the lid assembly and the carrier assembly; at least one load sensor placed on the weight-bearing portion positioned so as to measure a weight of the carrier assembly, whereby the at least one load sensor provides an output signal identifying the weight of the carrier assembly; and a control means for receiving the output signal and determining at least one cooking parameter for the food product.

In another embodiment, a method for determining a load size of a food product in a cooking device comprises the following steps: weighing a carrier assembly when the carrier assembly is empty to determine an empty carrier weight; weighing the carrier assembly when the carrier assembly contains a food product to determine a loaded carrier weight; determining a differential between the empty carrier weight and the loaded carrier weight, wherein said differential may be scaled to define a food product load; reporting the food product load; and modifying at least one cooking parameter responsive to the food product load.

It is an advantage of the invention that the load sensor relieves the operator of the responsibility or the authority of determining load size, thus eliminating or reducing product load errors.

Other objects, features, and advantages will be apparent to persons skilled in the relevant art in view of the following detailed description and the accompanying drawings.

BRIEF DESCRIPTION OF THE DRAWINGS

For a more complete understanding of the present invention and the advantages thereof, reference is now made to the following description taken in conjunction with the accompanying drawings, where like reference numerals represent like reference parts, wherein.

DETAILED DESCRIPTION OF PREFERRED EMBODIMENTS

Figure 1:
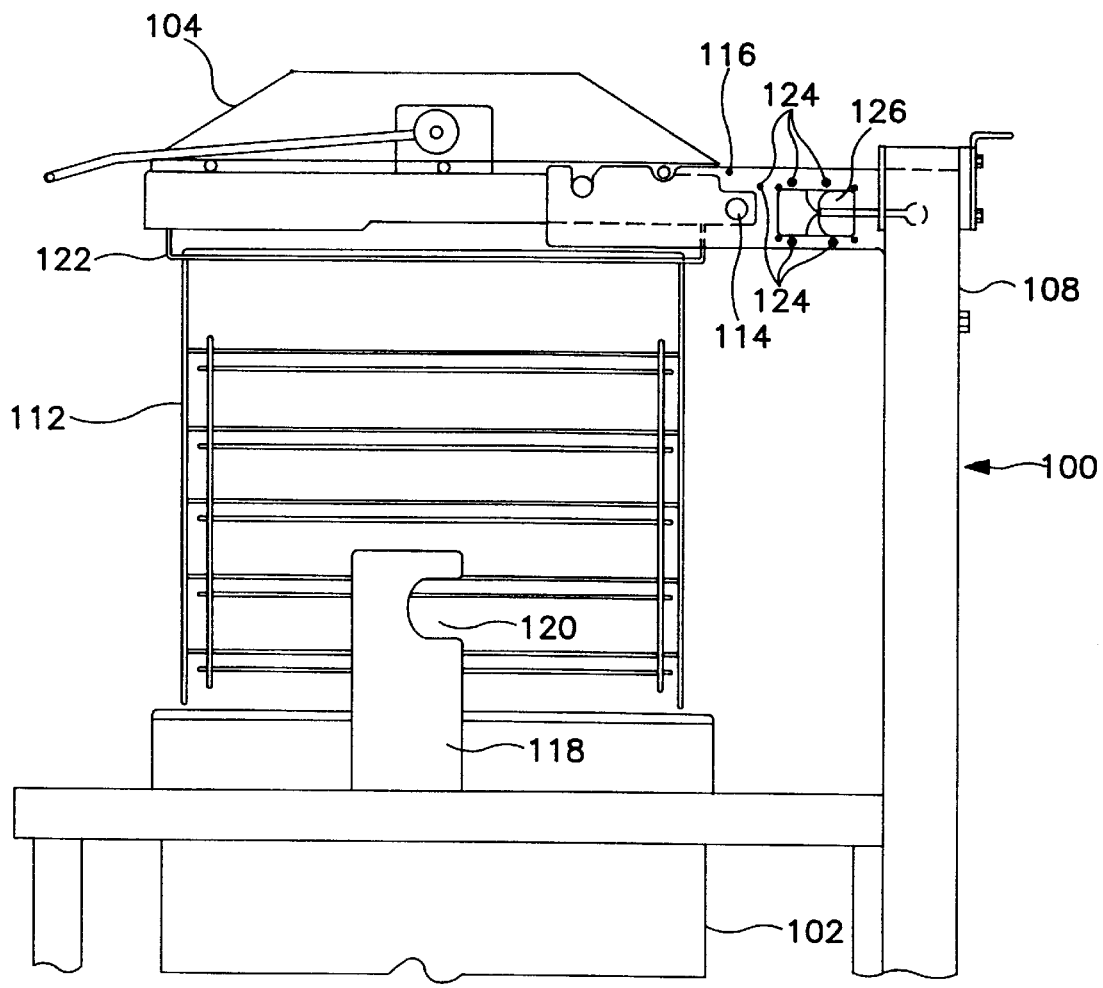
FIG. 1 is a side view of the apparatus in accordance with a first embodiment of the invention.

FIG. 1 depicts a configuration of a fryer which may be used according to a preferred embodiment of the present invention. It will be understood by those skilled in the art that the present invention may be readily implemented with a variety of fryers, such as the configurations disclosed herein. The specific fryer in these figures is shown as a preferred embodiment and for purposes of example.

Fryer system 100 comprises a cooking vessel 102, a lid assembly 104, a carrier assembly 112 attached to lid assembly 104, a fixed support block 108 on which the lid assembly 104 is mounted, at least one load-sensing transducer 124, and a controller (not shown). A cooking medium, e.g., oil or shortening, is held in cooking vessel 102 and the food products are cooked therein. Carrier assembly 112 may further include at least one basket (not shown), for holding the food products, or it may be adapted to receive at least one rack of a food product (not shown). Lid assembly 104 is attached to fixed support block 108, and may be either manually or automatically positioned to place carrier assembly 112 in the cooking medium and to remove carrier assembly 112 after the food product has been cooked. At least one transducer 124 is used to produce a signal which is used to measure the weight of the food products. In one embodiment, four transducers 124 are used. The output of transducers 124 is connected to the controller.

A suitable controller for fryer system 100 is the MC68HC11 microcontroller, manufactured by Motorola, Inc. of Schaumburg, Ill. Other types of processors, such as the Pentium™ processor, manufactured by Intel Corporation of Santa Clara, Calif., may also be used.

Fryer system 100 further includes a display means (not shown) for displaying information to a user. Suitable display means may include a plurality of light emitting diodes (LEDs), a cathode-ray tube (CRT), a liquid crystal display (LCD), a seven or thirteen segment display, or any other display that may be used to present information to an operator.

In one embodiment, an audio alarm may be used to convey information to a user. Buzzers, bells, chimes, or other sounds may be used to alert an operator of the status of fryer system 100. In another embodiment, a speaker is used to produce sounds for an operator. These may be human voice-simulating messages, or they may be pre-stored sounds.

The open top of cooking vessel 102 is adapted to be closed by lid assembly 104. Lid assembly 104 is pivotally journaled around a shaft 114 whose ends are received in perforations in a pair of parallel lid supporting arms 116. Supporting arms 116 may be slidably mounted in carriage 108. This mounting may include rollers, wheels, or the like to permit supporting arms 116 and, thus, lid assembly 104, may slide up and down carriage 108 between a closed position (not shown) and an elevated open position, shown in FIG. 1. Other positions may be provided along carriage 108. The movement of lid assembly 104 may be done either manually or by an automatic lining system (not shown).

Figure 2:
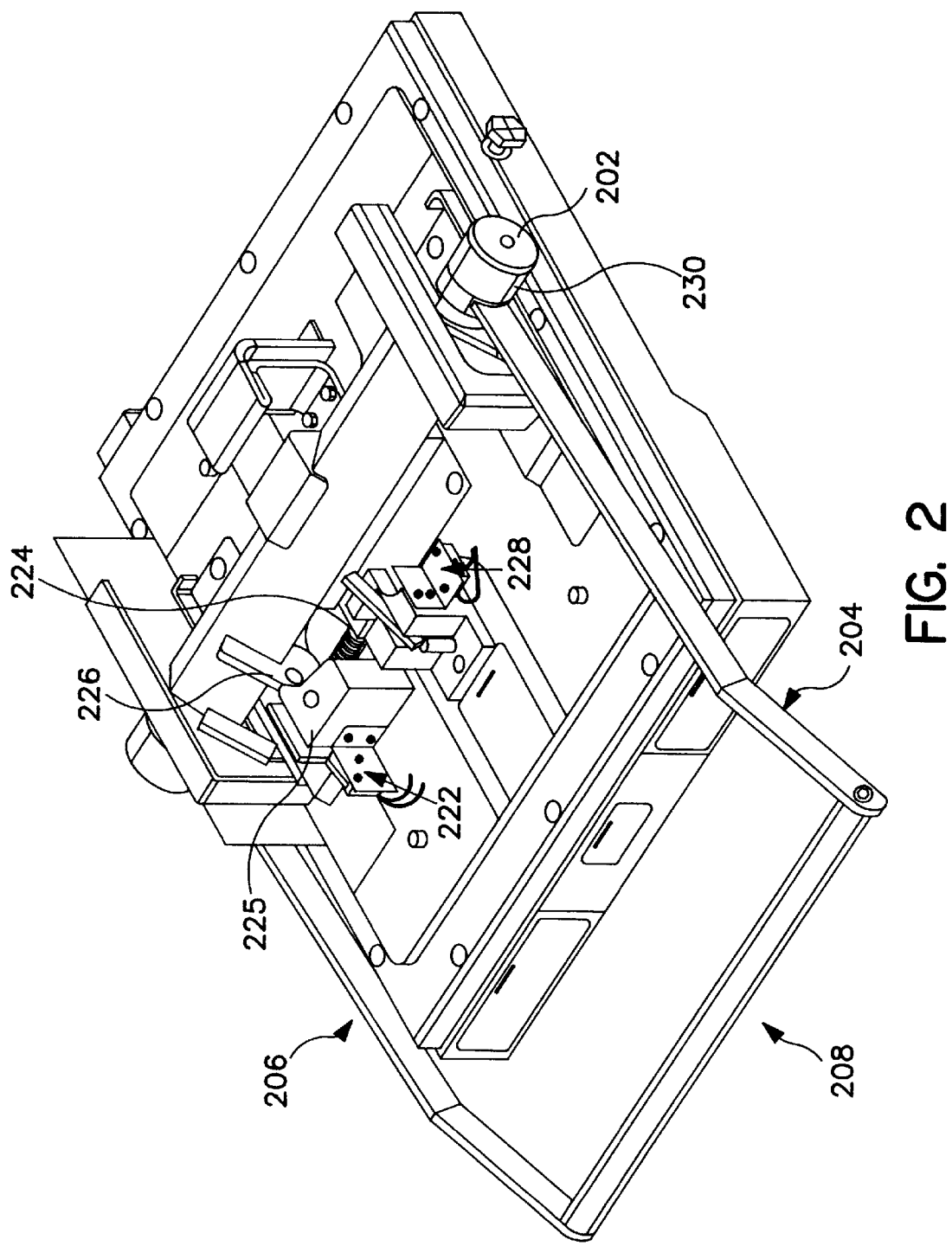
FIG. 2 is a perspective view of the lid assembly of the apparatus of FIG. 1.

Lid assembly 104 may be described in further detail with reference to FIGS. 1–3. Lid assembly 104 also provided with a locking mechanism in order to ensure that cooking vessel 102 is tightly sealed throughout the cooking cycle. Referring to FIG. 1, a pair of hook arms 118 extend upwardly from either side of the open end of cooking vessel 102. Referring now to FIG. 2, a cam bar 202 extends transverse to lid assembly 104 and is provided with forwardly extending arms 204 and 206, which are joined by a bar 208 parallel to cam bar 202. Referring now to FIGS. 1–2, the ends of the cam bar support rollers 230 are receivable within the slots 120 in hook arms 118. Cam bar 202 is manually moveable between a forward locking position and a rearward position. In its forward locking position, cam bar 202 has an over-center orientation with rollers 230 and bears upwardly against the upper surfaces of slots 120 of hook arms 118, and the main portion of cam bar 202 bears downwardly against lid assembly 104.

Figure 3:
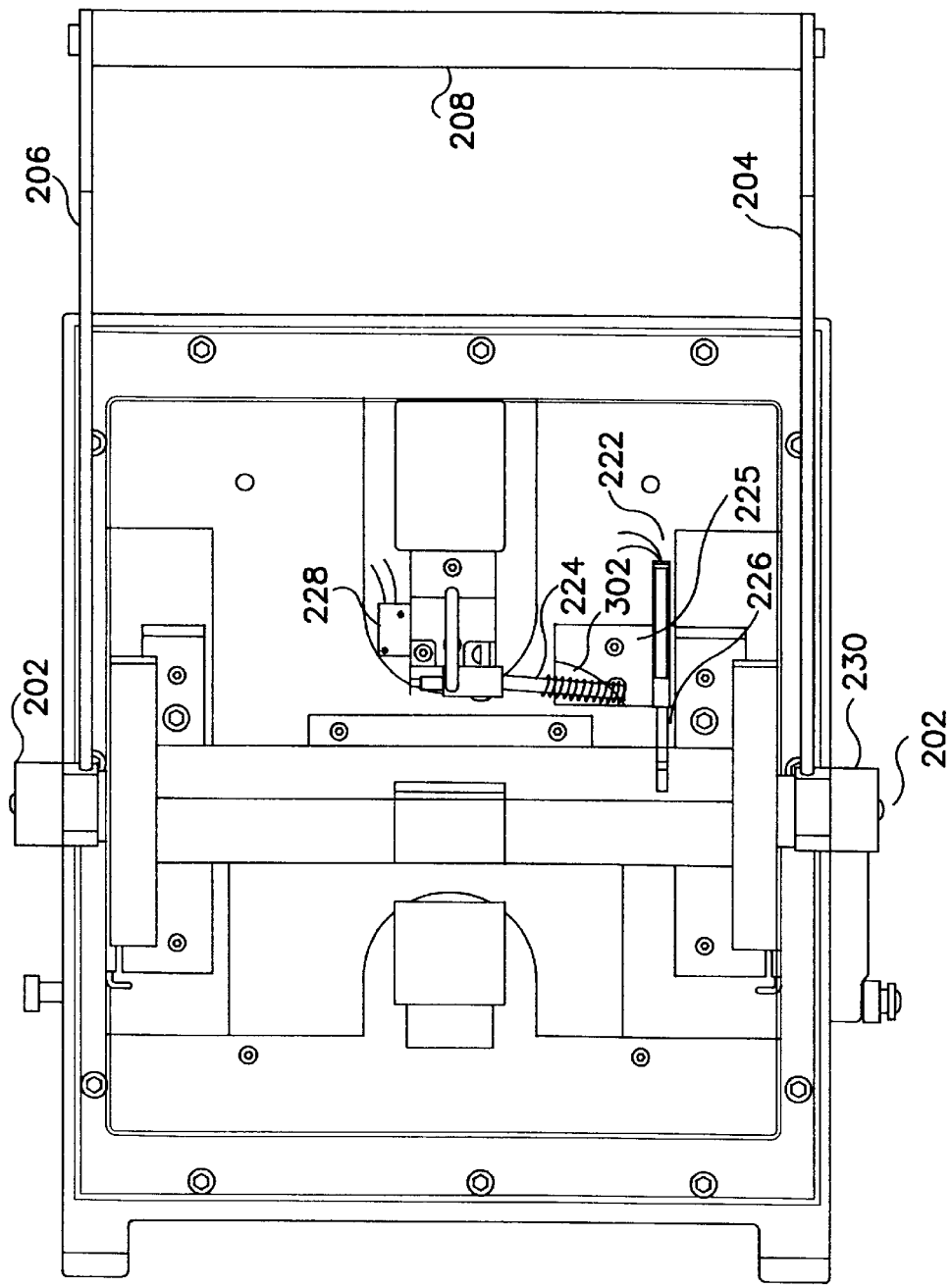
FIG. 3 is a top view of the lid assembly of FIG. 2.

Referring now to FIGS. 2–3, in order to ensure that the vat is properly sealed, a lid switch 222 is provided, as shown in FIGS. 2–3. If the lid is properly positioned in the forward locking position, the lid switch 222 is actuated, and the output is relayed to the controller. In order to ensure that the locking members are not accidentally released while the vat is under pressure, a safety latching mechanism 225 is provided which prevents the lid assembly 104 from being opened when the cook cycle is in progress. The latch mechanism comprises lock pins 224 surrounded by springs 302, so that lock pins 224 may be deflected against the compression of the springs and locked in a retracted position. In the retracted position, the free ends of lock pins 224 are displaced inwardly and permit the movement of lock arm 226. During cooking, lock pins 224 are in an extended position and prevent the movement of lock arm 226 and lid assembly 104. The safety latch mechanism further comprises lid switch 228 which is positioned to be actuated when lock pins 224 are in their retracted position. Lid switch 228 is connected to the controller and may be used to convey a warning signal, as discussed below.

Referring again to FIG. 1, the under side of lid assembly 104 is provided with an attachment for receiving carrier assembly 112. At least one basket (not shown) or rack (not shown) may be filled with a food product and is inserted into carrier assembly 112. When lid assembly 104 is shifted from its elevated open position to its closed position, the food product is lowered into cooking vessel 102. Carrier assembly 112 may be readily removed from the lid for cleaning purposes, or when it is desired to clean the lid itself.

The control system determines a food product load weight from the signals generated by at least one transducer 124. Examples of suitable transducers 124 include a strain gauge, a piezoelectric element, or a spring assembly with optical transduction. Transducers 124 may be positioned at any location in fryer 100 that bears the product load. For example, transducer 124 may be placed in fixed support block 108. In particular, in order to weigh the food products, strain gauges may be placed on fixed support block 108 to which lid assembly 104 is attached. A slot may be cut in the block to allow the required movement for the gauge. Transducer 124 may also be placed on the lid support arms 116. Referring to FIG. 1, the sensing mechanism may comprise at least one load cell 126 on each lid support arm 116. Each load cell 126 may comprise four strain gauges.

Load cells 126 may also be placed on an 8-head, i.e., four-rack, lid to automatically determine how many racks of a food product have been placed in carrier assembly 112. This information may be used to automatically correct cooking parameters including, inter alia, cooking temperature, cooking time, and the like.

If transducer 124 is mounted in lid assembly 104, such that it supports the combined weight of carrier assembly 112 and the food product, the control determines the food product weight by subtracting the known empty weight of carrier assembly 112.

Figure 4:
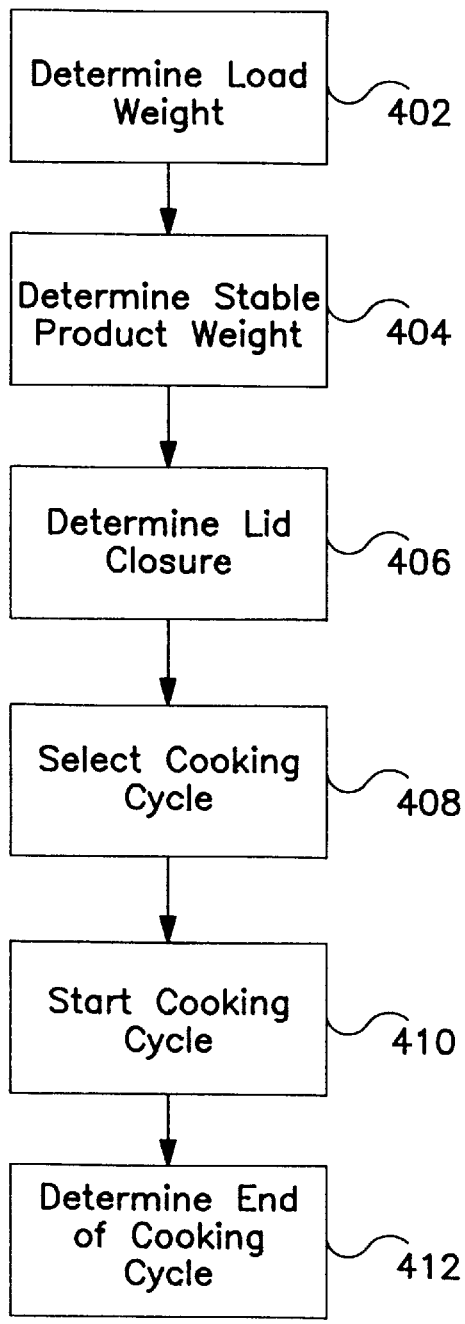
FIG. 4 is a flowchart depicting a method for determining load size in accordance with a second embodiment of the invention.

Referring to FIG. 4, a flowchart depicting the method for automatically determining load size of a food product. In step 402, first the product weight is determined. The load may be calculated at different times depending on the type of fryer 100 used (i.e., a fryer that automatically positions lid assembly 104 or a fryer that requires manual positioning of lid assembly 104). In a first embodiment, if lid assembly 104 is automatically positioned, the product weight is determined as soon as the food product is placed in carrier assembly 112. In a second embodiment, if lid assembly 104 is manually positioned, the control continuously measures the output of at least one transducer 124. The net product weight for the manual lift carrier assembly 112 is calculated as the maximum recorded weight before the cook cycle is started.

Figure 5:
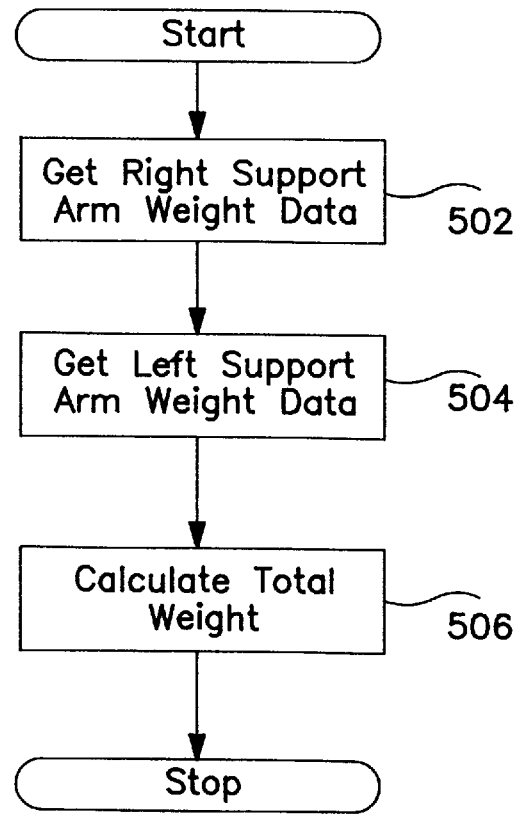
FIG. 5 is a flow chart depicting a total load weight calculation routine.

Referring to FIG. 5, a flowchart depicting the total load weight calculation is provided. In steps 502 and 504, controller retrieves weight data from at least one transducer 124 in support arms 116. In one embodiment, there is a least one transducer 124 in each of the support arms 116, and weight data from the right support arm is gathered first, followed by the data from the left support arm. However, this data may be gathered in the opposite order, or it may be gathered simultaneously.

The data gathered in steps 502 and 504 may not be accurate representations of the actual weight of the food product. Thus, in step 506, calibration information may be used in order to account for the transducers and other factors, including, inter ali, operating temperature, type of transducer, and the like. For example, at least one thermistor, or other temperature sensing device, may be located near the transducer location in order to sense the operating temperature of the transducer. Based on the operating temperature, the performance of the transducer may be calibrated in a manner that is known to those skilled in the art. At the completion of step 506, the actual weight that each support arm 116 detects is known.

Figure 6:
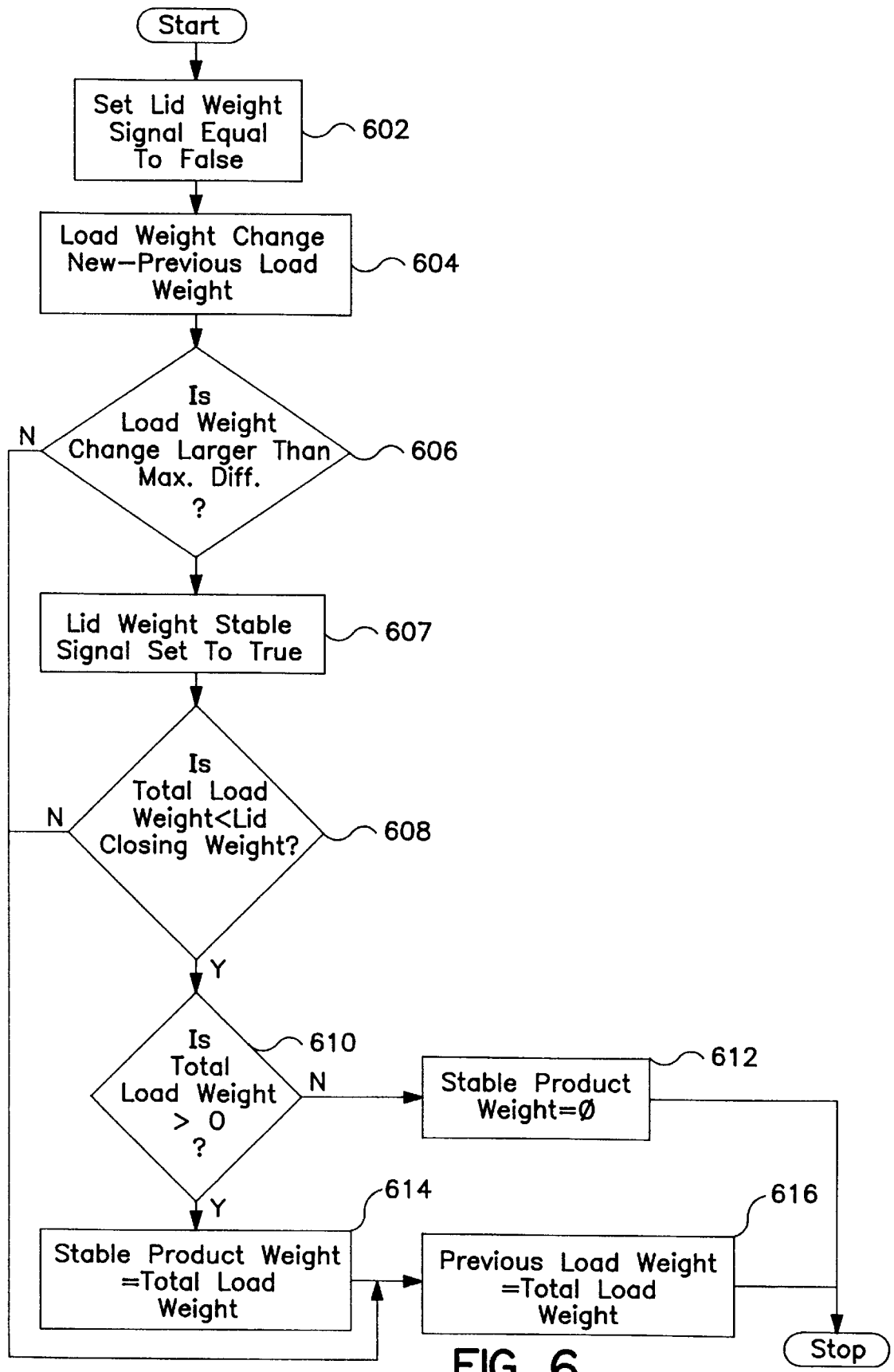
FIG. 6 is a flow chart depicting a stable product weight calculation routine.

Referring to FIG. 4, once the actual weight that each support arm 116 detects is known, in step 404, the stable product weight is determined. Referring to FIG. 6, in step 602, the controller first sets the lid weight stable signal equal to false. Next, in step 604, the controller determines the load weight change, i.e., the difference between the new and previous load weights. In step 606, the controller determines if the change in load weight, either positive or negative, is less than or equal to a maximum allowed differential. The maximum differential may be based on safety considerations (e.g., the maximum weight before the cooling substance is likely to boil over), or it may based on the capacity of the lid, or it may be a percentage thereof. This step also provides hysteresis in that it allows for minor fluctuations in the load weight before determining that the lid weight is unstable. If the change is less than or equal to the maximum allowed differential, in step 607, the lid weight stable signal is set to true, as the lid weight is essentially stable. Next, in step 608, the controller determines if the total load weight is less than the lid closing weight. The lid closing weight is defined as a certain weight on lid assembly 104 sensed in a certain period of time. This weight may be the maximum weight of lid assembly 104, carrier assembly 112, and the maximum weight of the food product. The lid closing weight also may be determined during the calibration of the transducers. If the weight is greater than the lid closing weight, this indicates that the lid is being closed. If it is, in step 610, the controller determines if the total load weight is greater than zero. If it is not greater than zero, in step 612, the stable product weight is set to be equal to zero. If the total load weight is greater than zero, in step 614 the stable product weight is set to be equal to the total load weight. Next, in step 616, if the total load weight is not less than the lid closing weight, or after the stable product weight is set to be equal to the total load weight, the previous load weight is set to be equal to the total load weight.

Figure 7:
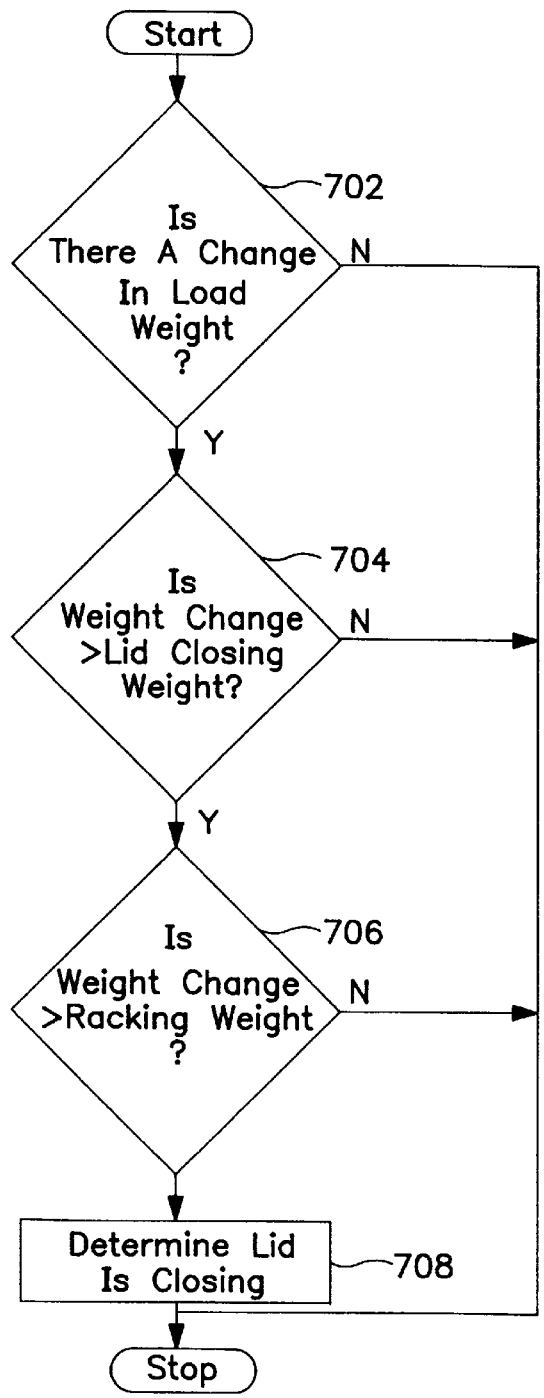
FIG. 7 is a flow chart depicting a lid closure determination routine.

Referring to FIG. 4, once the stable product weight is determined, in step 406 the controller determines lid closure. Referring to FIG. 7, a flowchart depicting how the controller determine lid closure of lid assembly 104 is provided. In step 702, the controller determines if there is a change in the load weight. If there is not a change in load weight, no further action is taken. If there is a change in load weight, controller determines if the value of the weight change is greater than the lid closing weight, discussed above. If there is no change in load weight, no action is taken. If the change is greater than the lid closing weight, in step 706, the controller determines whether the weight change in the load weight is greater than the racking weight change. Racking weight change is defined as a change in weight indicating the addition of food product. For instance, if a weight addition is determined that is greater than zero pounds, but less than the weight for a rack, controller determines that an additional rack has been added. If it is not, no action is taken. If the weight change in load weight is greater than the racking weight change, in step 708, controller determines that the lid is closing.

A timer may also be used to determine if the change in lid weight is due to an increase in food product, of if it is due to another event, such as a person leaning against lid assembly 104. This information may be further provided to display.

Figure 8:
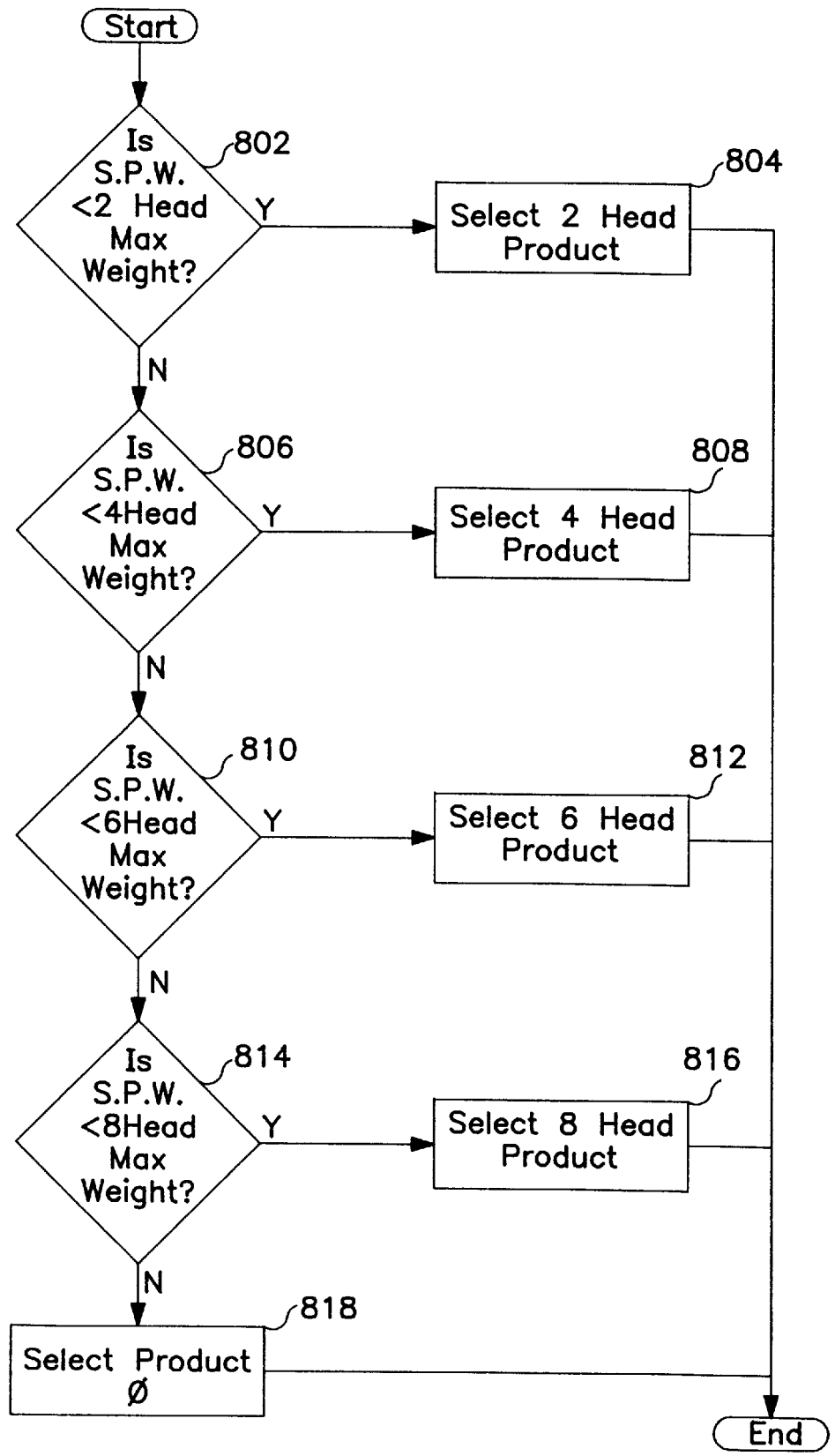
FIG. 8 is a flow chart depicting an automatic cycle selection routine.

Referring again to FIG. 4, in step 408 the appropriate cooking cycle is selected. Referring now to FIG. 8, in step 802, controller determines if the load weight is less than the maximum weight for a two head rack. If the load weight is less than the maximum weight for a two head rack, in step 804 controller selects the two head product cycle. If the load weight is not less than the maximum weight for a two head rack, in step 806 controller determines if the load weight is less than the maximum weight for a four head rack. If the load weight is less than the maximum weight for a four head rack, in step 808 controller selects the four head product cycle. If the load weight is not less than the maximum weight for a four head rack, in step 810 controller determines if the load weight is less than the maximum weight for a six head rack. If the load weight is less than the maximum-weight for a six head rack, in step 812 controller selects the six head product cycle. If the load weight is not less than the maximum weight for a six head rack, in step 814 controller determines if the load weight is less than the maximum weight for an eight head rack. If the load weight is less than the maximum weight for an eight head rack, in step 816 controller selects the eight head product cycle. If the load is not less than the maximum weight for an eight head rack, indicating that the load weight has exceeded the maximum allowable weight, controller selects product cycle zero. An appropriate message or alarm may be generated indicating the cooking cycle that was selected.

Figure 9:
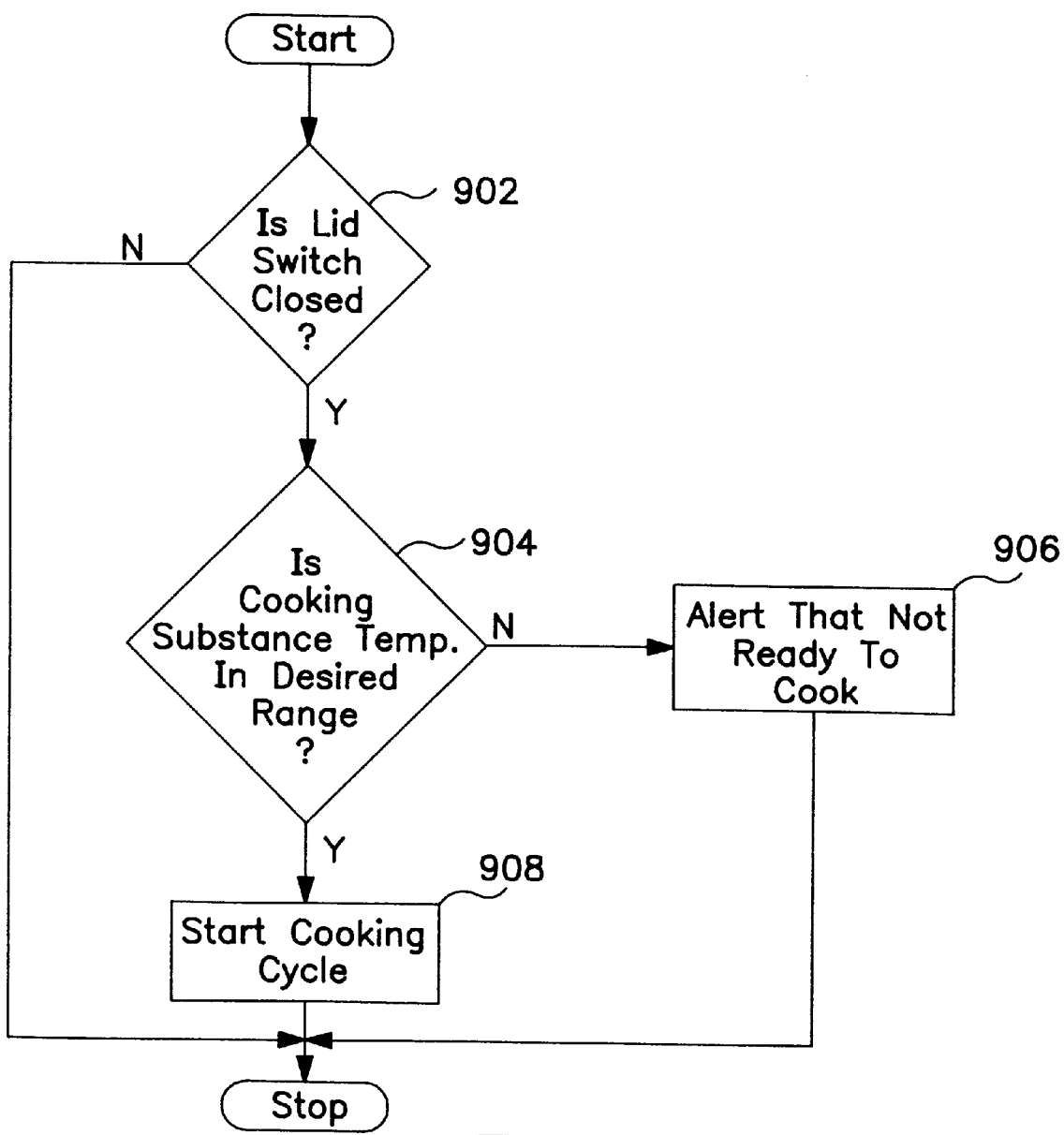
FIG. 9 is a flow chart depicting an automatic start of cycle routine.

Referring again to FIG. 4, in step 410, the selected cooking cycle is initiated. Referring now to FIG. 9, in step 902, controller determines if lid switch 222 is closed. If lid switch 222 is closed, controller determines if the temperature of the cooking substance is at the desired temperature. If the temperature of the cooking substance is not at the desired temperature, an alarm or message indicating that the fryer is not ready is generated in step 906. If the temperature of the cooking substance is at the desired temperature, in step 908 the cooking cycle is initiated.

Figure 10:
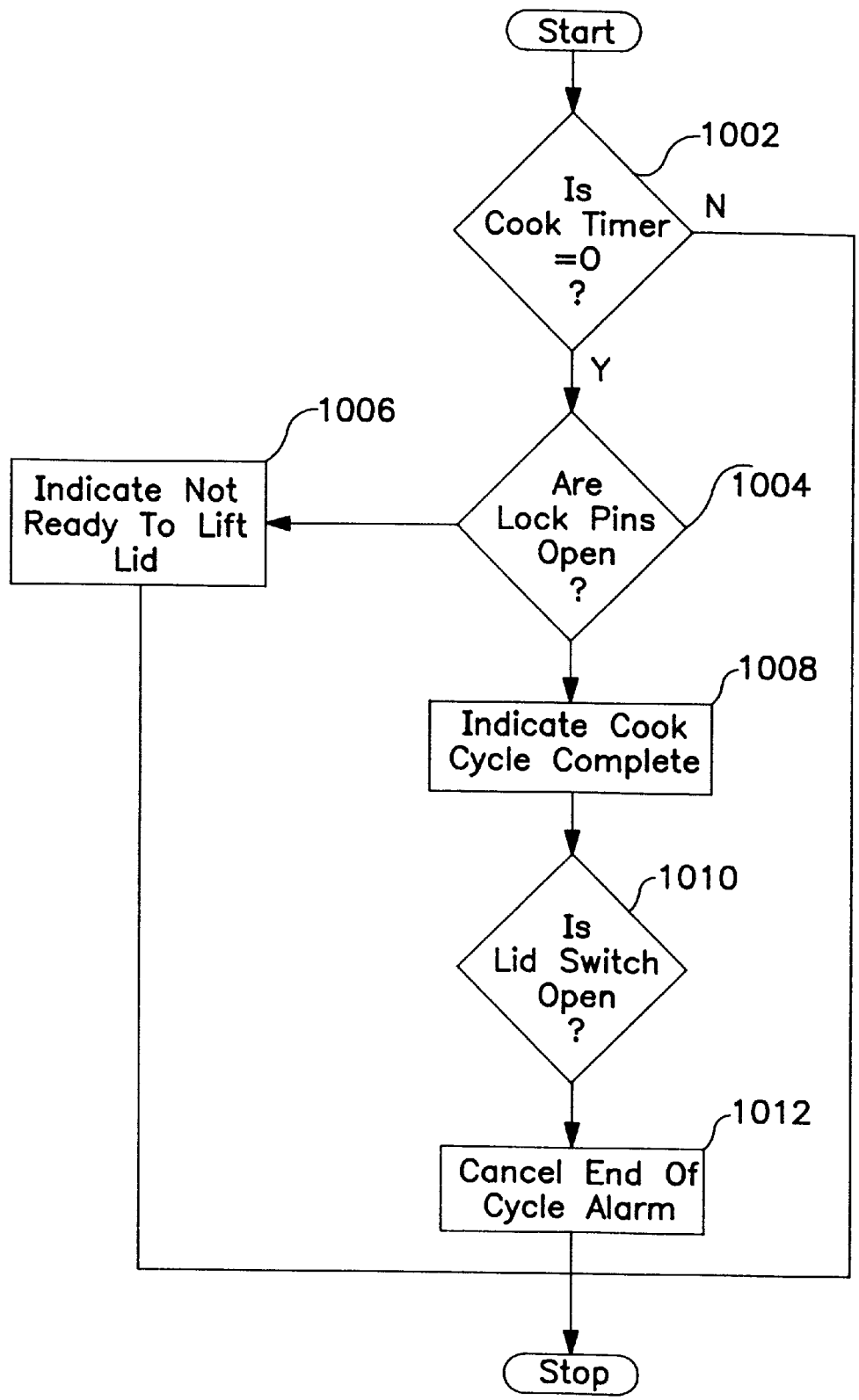
FIG. 10 is a flow chart depicting an automatic end of cycle routine.

Referring again to FIG. 4, in step 412, the cooking cycle is completed. Referring to FIG. 10, in step 1002, controller determines if the cook timer is equal to zero. If the cook timer is not equal to zero, indicating that the cooking cycle is not compete, no action is taken. If the cook timer is equal to zero, in step 1004, controller determines if lock pins 224 are open. If lock pins 224 are not open, in step 1006, indicating that it is not ready to lift lid assembly 104, a message indicating that cooking cycle is not complete may be displayed, or an alarm indicating such be sounded. If lock pins 224 are open, indicating that it is ready to raise lid assembly 104, in step 1008, a message indicating that the cooking cycle is completed is displayed. Next, in step 1010, controller determines if lid switch 228 is open. If lid switch 228 is open, the alarm indicating the end of the cycle is canceled. If lid switch 228 is not open, no action is taken.

In another embodiment, transducers 124 also may be used to measure the product weight after cooking, and determine the ratio of the cooked product weight to the uncooked product weight, i,e., yield. An abnormal yield (e.g., the cooked product weight is outside of an expected range) can indicate equipment or product problems such as heating element failure, wrong product type, wrong cooking time, or some other control failure. If the yield is outside a certain predetermined range (i.e., there is a difference of about 20% between its pre-cooking weight and its post-cooking weight), a message indicating such may be generated for the operator.

While the invention has been described in connection with preferred embodiments, it will be understood by those skilled in the art that other variations and modifications of these preferred embodiments described above can be made without departing from the scope of the invention.

What is claimed is:

1. An apparatus for determining a load size of a food product in a cooking device comprising:

a carrier assembly for receiving a food product;

a cooking vessel containing a cooking medium, for receiving said carrier assembly;

a lid assembly for raising and lowering said carrier assembly;

a weight-bearing portion for supporting said lid assembly and said carrier assembly;

at least one load sensor placed on said weight-bearing portion so as to measure a weight of said carrier assembly, said at least one load sensor providing an output signal; and a control means for receiving said output signal and determining at least one cooking parameter for said food product.

2. The apparatus of claim 1, wherein said load sensor is a weight transducer.

3. The apparatus of claim 2, wherein said load sensor is a strain gauge.

4. The apparatus of claim 2, wherein said load sensor is a piezoelectric element.

5. The apparatus of claim 2, wherein said load sensor is a spring assembly with optical transduction.

6. The apparatus of claim 1, wherein said weight-bearing portion is a fixed block.

7. The apparatus of claim 6, wherein said load sensor is located on said fixed block.

8. The apparatus of claim 7, wherein said load sensor is placed in a slot formed in said fixed block.

9. The apparatus of claim 1, wherein the lid assembly is a manually positioned lid assembly.

10. The apparatus of claim 1, wherein the lid assembly is an automatically positioned lid assembly.

11. The apparatus of claim 1, wherein said carrier assembly comprises:

at least one basket assembly.

12. A method for determining a load size of a food product in a deep fat fryer comprising:

weighing a carrier assembly of said deep fat fryer when said carrier assembly is empty to determine an empty carrier weight;

loading said carrier assembly with a food product;

weighing said loaded carrier assembly to determine a loaded carrier weight;

determining a differential between said empty carrier weight and said loaded carrier weight, resulting in a food product load; and determining at least one cooking parameter responsive to said food product load.

13. The method of claim 12, wherein the loaded carrier assembly of said deep fat fryer having an automatic lid assembly lift is weighed when an operator starts a cook cycle.

14. The method of claim 12, wherein the loaded carrier assembly of said deep fat fryer having a manual lid assembly lift is weighed continuously.

15. The method of claim 14, wherein the food product load is determined by determining a maximum recorded weight before a cook cycle is started by an operator.

16. The method of claim 15 wherein a cooking time is modified in response to said food product load.

17. The method of claim 15, wherein a cooking temperature is modified in response to said food product load.

18. The method of claim 15, wherein a shortening temperature is measured in response to said food product load.

19. The method of claim 12, further comprising generating an alarm in response to one of said at least one cooking parameter is outside of a predetermined range.

20. The method of claim 12 further comprising:

cooking said food product; and weighing the food product after said cooking, resulting in a cooked weight.

21. The method of claim 20 further comprising:

determining a yield of said cooking device by dividing the cooked weight by the food product load.

22. The apparatus of claim 1, wherein said at least one cooking parameter is selected from the group consisting of cooking temperature and cooking time.

23. The method of claim 12, wherein said at least one cooking parameter is selected from the group consisting of cooking temperature and cooking time.

* * * * *